(12) United States Patent
Karas et al.

(10) Patent No.: US 11,499,108 B2
(45) Date of Patent: Nov. 15, 2022

(54) COMPLETE REMOVAL OF SOLIDS DURING HYDROGEN SULFIDE SCAVENGING OPERATIONS USING A SCAVENGER AND A MICHAEL ACCEPTOR

(71) Applicant: ChampionX USA Inc., Sugar Land, TX (US)

(72) Inventors: Lawrence J. Karas, Missouri City, TX (US); Matthew Aaron Trevino, Houston, TX (US); Kellen Harkness, Sugar Land, TX (US); Jeffrey Robert Eveland, Sugar Land, TX (US)

(73) Assignee: ChampionX USA Inc., Sugar Land, TX (US)

( * ) Notice: Subject to any disclaimer, the term of this patent is extended or adjusted under 35 U.S.C. 154(b) by 26 days.

(21) Appl. No.: 16/747,665

(22) Filed: Jan. 21, 2020

(65) Prior Publication Data

US 2020/0231888 A1 Jul. 23, 2020

Related U.S. Application Data

(60) Provisional application No. 62/795,678, filed on Jan. 23, 2019.

(51) Int. Cl.
*C10L 3/00* (2006.01)
*C10L 3/10* (2006.01)
*C10G 29/20* (2006.01)
*C10G 29/24* (2006.01)

(52) U.S. Cl.
CPC .............. *C10L 3/103* (2013.01); *C10G 29/20* (2013.01); *C10G 29/24* (2013.01); *C10G 2300/207* (2013.01); *C10L 2290/541* (2013.01)

(58) Field of Classification Search
CPC ... C10L 3/103; C10L 2290/541; C10G 29/20; C10G 29/24; C10G 2300/207
See application file for complete search history.

(56) References Cited

U.S. PATENT DOCUMENTS

| | | | |
|---|---|---|---|
| 169,949 | A | 12/1875 | Brown et al. |
| 2,430,858 | A | 11/1947 | Borsoff et al. |
| 2,776,870 | A | 1/1957 | Fischer |

(Continued)

FOREIGN PATENT DOCUMENTS

| | | |
|---|---|---|
| CA | 1257606 A | 7/1989 |
| CA | 1283397 C | 4/1991 |

(Continued)

OTHER PUBLICATIONS

PCT International Search and Written Opinion for PCT/US2020/014344, dated Apr. 22, 2020, 11 pages.

(Continued)

*Primary Examiner* — Prem C Singh
*Assistant Examiner* — Brandi M Doyle
(74) *Attorney, Agent, or Firm* — Eric D. Babych; Barnes & Thornburg LLP

(57) ABSTRACT

Disclosed herein are scavenging and antifouling compositions useful in applications relating to the production, transportation, storage, and separation of crude oil and natural gas. Also disclosed herein are methods of using the compositions as scavengers and antifoulants, particularly in applications relating to the production, transportation, storage, and separation of crude oil and natural gas.

19 Claims, 1 Drawing Sheet

(56) References Cited

U.S. PATENT DOCUMENTS

| | | | |
|---|---|---|---|
| 2,878,294 A | 3/1959 | Kress | |
| 2,900,350 A | 8/1959 | Kirkpatrick | |
| 3,071,433 A | 1/1963 | Dunn | |
| 3,458,444 A | 7/1969 | Shepherd et al. | |
| 3,519,691 A | 7/1970 | von Portatius | |
| 3,855,210 A | 12/1974 | Keller | |
| 3,880,784 A | 4/1975 | Wagner et al. | |
| 3,888,668 A | 6/1975 | Keller | |
| 4,036,942 A | 7/1977 | Sibeud et al. | |
| 4,107,106 A | 8/1978 | Dunleavy et al. | |
| 4,195,151 A | 3/1980 | Dunleavy et al. | |
| 4,327,092 A | 4/1982 | Collington et al. | |
| 4,342,756 A | 8/1982 | Collington et al. | |
| 4,410,436 A | 10/1983 | Holstedt et al. | |
| 4,412,928 A | 11/1983 | Holstedt et al. | |
| 4,557,843 A | 12/1985 | Holstedt et al. | |
| 4,623,474 A | 11/1986 | Holstedt et al. | |
| 4,627,930 A | 12/1986 | Holstedt et al. | |
| 4,629,579 A | 12/1986 | Jessup et al. | |
| 4,629,580 A | 12/1986 | Holstedt et al. | |
| 4,657,686 A | 4/1987 | Holstedt et al. | |
| 4,680,127 A | 7/1987 | Edmondson | |
| 4,724,099 A | 2/1988 | Holstedt et al. | |
| 4,748,011 A | 5/1988 | Baize | |
| 4,756,842 A | 7/1988 | Holstedt et al. | |
| 4,760,133 A | 7/1988 | Niwa et al. | |
| 4,801,729 A | 1/1989 | Holstedt et al. | |
| 4,892,670 A | 1/1990 | Mendelson | |
| 4,976,935 A | 12/1990 | Lynn | |
| 4,978,512 A | 12/1990 | Dillon | |
| 5,213,680 A | 5/1993 | Kremer et al. | |
| 5,304,361 A | 4/1994 | Parisi | |
| 5,700,438 A | 12/1997 | Miller | |
| 5,744,024 A | 4/1998 | Sullivan, III et al. | |
| 6,048,968 A | 4/2000 | Etzbach et al. | |
| 6,267,913 B1 | 7/2001 | Marder et al. | |
| 6,544,492 B1 | 4/2003 | DeBerry | |
| 6,608,228 B1 | 8/2003 | Cumpston et al. | |
| 6,942,037 B1 | 9/2005 | Arnold et al. | |
| 7,078,005 B2 | 7/2006 | Smith et al. | |
| 7,235,194 B2 | 6/2007 | Cumpston et al. | |
| 7,438,877 B2 | 10/2008 | Salma et al. | |
| 7,781,187 B2 | 8/2010 | Gasper et al. | |
| 8,173,635 B2 | 5/2012 | Jimenez et al. | |
| 8,197,722 B2 | 6/2012 | Marder et al. | |
| 8,367,697 B2 | 2/2013 | Jimenez et al. | |
| 8,597,549 B2 | 12/2013 | Cumpston et al. | |
| 8,734,637 B2 | 5/2014 | Taylor | |
| 9,347,010 B2 | 5/2016 | Gonzalez et al. | |
| 9,468,882 B2 | 10/2016 | Laroche et al. | |
| 9,523,045 B2 | 12/2016 | Harrington et al. | |
| 2002/0185634 A1 | 12/2002 | Marder et al. | |
| 2004/0086443 A1 | 5/2004 | Schield et al. | |
| 2004/0096382 A1 | 5/2004 | Smith et al. | |
| 2004/0110984 A1 | 6/2004 | Cumpston et al. | |
| 2005/0238556 A1 | 10/2005 | Pakulski et al. | |
| 2007/0154980 A1 | 7/2007 | Gasper et al. | |
| 2007/0254222 A1 | 11/2007 | Bender et al. | |
| 2008/0209799 A1 | 9/2008 | Woods et al. | |
| 2008/0283804 A1 | 11/2008 | Cumpston et al. | |
| 2009/0291937 A1 | 11/2009 | Jimenez et al. | |
| 2010/0116678 A1 | 5/2010 | Wang et al. | |
| 2011/0031165 A1 | 2/2011 | Karas et al. | |
| 2011/0155646 A1 | 6/2011 | Karas et al. | |
| 2011/0220551 A1 | 9/2011 | Taylor | |
| 2012/0149680 A1 | 6/2012 | Jimenez et al. | |
| 2012/0012507 A1 | 9/2012 | Compton et al. | |
| 2012/0241361 A1 | 9/2012 | Ramachandran et al. | |
| 2013/0172623 A1 | 7/2013 | Kaplan | |
| 2013/0240409 A1 | 9/2013 | Subramaniyam | |
| 2013/0274426 A1 | 10/2013 | Sugiura et al. | |
| 2013/0299734 A1 | 11/2013 | Yang et al. | |
| 2014/0041893 A1 | 2/2014 | Adams et al. | |
| 2014/0166282 A1 | 6/2014 | Martinez et al. | |
| 2014/0166288 A1 | 6/2014 | Bailey et al. | |
| 2014/0166289 A1 | 6/2014 | Martinez et al. | |
| 2014/0190870 A1 | 7/2014 | Lehrer et al. | |
| 2014/0209510 A1 | 7/2014 | Harrington et al. | |
| 2014/0234191 A1 | 8/2014 | Laroche et al. | |
| 2015/0175877 A1 | 6/2015 | Shindgikar et al. | |
| 2016/0312141 A1 | 10/2016 | Rana et al. | |
| 2017/0066697 A1 | 3/2017 | Blotsky et al. | |
| 2017/0066976 A1 | 3/2017 | Jones et al. | |
| 2017/0066977 A1 | 3/2017 | Rana et al. | |
| 2018/0030360 A1 | 2/2018 | Trevino et al. | |
| 2018/0221811 A1 | 8/2018 | Volberg et al. | |
| 2019/0062187 A1* | 2/2019 | Dhawan | C23F 11/149 |

FOREIGN PATENT DOCUMENTS

| | | |
|---|---|---|
| CN | 1757796 A | 4/2006 |
| CN | 1814595 A | 8/2006 |
| CN | 1309868 C | 4/2007 |
| CN | 101037541 A | 9/2007 |
| CN | 100503595 C | 6/2009 |
| CN | 102993047 A | 3/2013 |
| CN | 103012199 A | 4/2013 |
| CN | 103018237 A | 4/2013 |
| CN | 103691277 A | 4/2014 |
| CN | 102993047 B | 9/2014 |
| CN | 103018237 B | 9/2014 |
| DE | 219030 | 12/1908 |
| DE | 236746 | 11/1910 |
| DE | 1092002 | 11/1960 |
| DE | 2729918 A1 | 1/1979 |
| DE | 3301822 A1 | 8/1983 |
| DE | 219030 A3 | 2/1985 |
| DE | 236746 A1 | 6/1986 |
| DE | 3925256 A1 | 1/1991 |
| DE | 19820400 A1 | 11/1999 |
| EP | 0202600 A2 | 11/1986 |
| EP | 411409 A1 | 2/1991 |
| EP | 955342 B1 | 7/2001 |
| EP | 1363985 B1 | 8/2007 |
| EP | 2364768 A1 | 9/2011 |
| GB | 1107057 | 3/1968 |
| GB | 1107244 | 3/1968 |
| GB | 2114144 B | 7/1985 |
| JP | S58129059 A | 8/1983 |
| JP | H01271416 A | 10/1989 |
| JP | H03099038 A | 4/1991 |
| JP | 2000026746 A | 1/2000 |
| JP | 2006219506 A | 8/2006 |
| JP | 2009522406 A | 6/2009 |
| JP | 2011038215 A | 2/2011 |
| JP | 5441053 B2 | 3/2014 |
| JP | WO2012086189 A1 | 5/2014 |
| PL | 144233 B1 | 4/1988 |
| RU | 2118649 C1 | 9/1998 |
| RU | 2197605 | 1/2003 |
| RU | 2220756 | 1/2004 |
| RU | 2246342 C1 | 2/2005 |
| RU | 2305123 | 8/2007 |
| RU | 2348679 C2 | 3/2009 |
| RU | 2372341 | 11/2009 |
| RU | 2008122310 A | 12/2009 |
| RU | 2404175 C1 | 11/2010 |
| RU | 2466175 C1 | 11/2010 |
| RU | 2418036 C1 | 5/2011 |
| RU | 2009143509 A | 5/2011 |
| RU | 2470987 C1 | 12/2012 |
| RU | 2490311 C1 | 8/2013 |
| WO | 9007467 | 7/1990 |
| WO | 9821521 A1 | 5/1998 |
| WO | 2000/66492 | 11/2000 |
| WO | 02051968 A1 | 7/2002 |
| WO | 2007078926 A2 | 7/2007 |
| WO | 2008027721 A1 | 3/2008 |
| WO | 2008155333 A1 | 12/2008 |
| WO | 2012086189 A1 | 6/2012 |
| WO | 2014025577 A1 | 2/2014 |
| WO | 2016030262 A1 | 3/2016 |
| WO | 2016100224 A2 | 6/2016 |

(56) References Cited

FOREIGN PATENT DOCUMENTS

| | | |
|---|---|---|
| WO | 2018001629 | 1/2018 |
| WO | 2018001630 | 1/2018 |
| WO | 2018001631 | 1/2018 |

OTHER PUBLICATIONS

Unknown Author, Naval Research Laboratory, cited in EP 14746318.6 by EPO, Jan. 1, 1900, no source information given, pp. 29-30.
Walker, J. Frederic, "Formaldehyde," New York: Reinhold Publishing Corporation, 1964, Third Edition, p. 264.

* cited by examiner

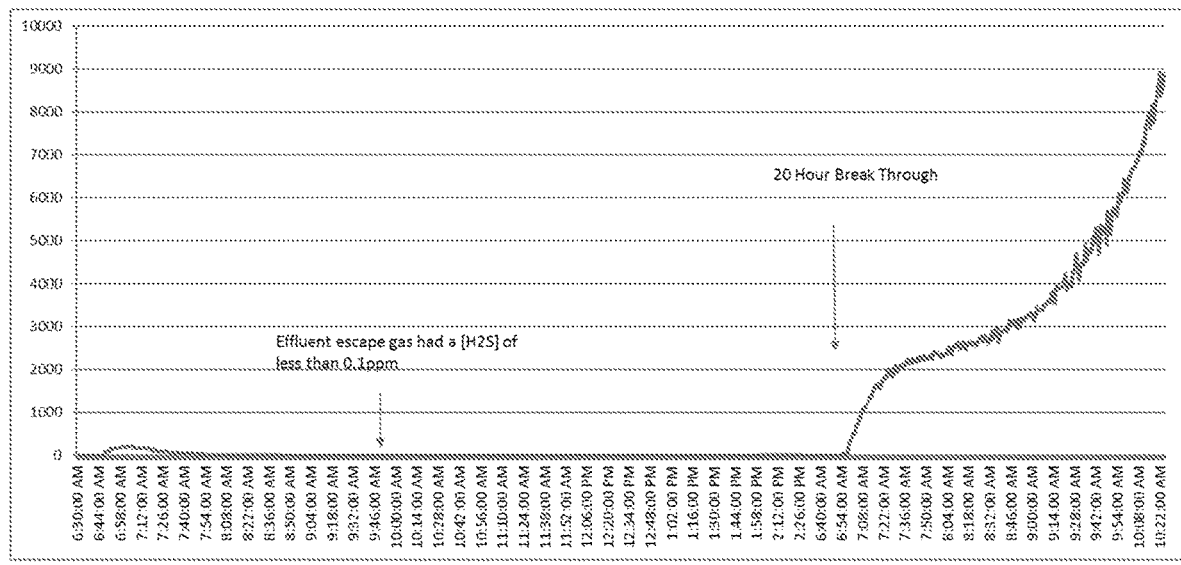

COMPLETE REMOVAL OF SOLIDS DURING HYDROGEN SULFIDE SCAVENGING OPERATIONS USING A SCAVENGER AND A MICHAEL ACCEPTOR

FIELD

The present disclosure relates generally to scavengers of sulfur-based species, and more particularly to compositions for scavenging sulfur-containing compounds, such as hydrogen sulfide and/or mercaptans, and preventing fouling.

BACKGROUND

The removal of sulfur-based species from liquid or gaseous hydrocarbon streams is a problem that has long challenged many industries. Hydrogen sulfide is a problem in the oil industry, particularly in the drilling, production, transportation, storage, and processing of crude oil, as well as waste water associated with crude oil. The same problems exist in the natural gas industry and geothermal power plants.

The presence of sulfur-containing compounds, such as hydrogen sulfide, can result in the deposition of sulfur containing salts, which can cause plugging and corrosion of transmission pipes, valves, regulators and other process equipment. Even flared natural gas needs to be treated to avoid acid rain generation due to $SO_x$ formation. Also, in the manufactured gas industry or coke making industry, coal-gas emissions containing unacceptable levels of hydrogen sulfide are commonly produced from destructive distillation of bituminous coal.

Since hydrogen sulfide has an offensive odor and natural gas containing it is called "sour" gas, treatments to lower hydrogen sulfide are termed "sweetening" processes. When a particular compound is used to remove or lower $H_2S$, it is called scavenging agent or scavenger.

BRIEF SUMMARY

In some aspects, the present disclosure provides compositions that comprise a Michael acceptor and a scavenging compound. The scavenging compound comprises formaldehyde and/or a formaldehyde equivalent and the Michael acceptor comprises an α,β-unsaturated ester.

In some embodiments, the Michael acceptor comprises the following structure:

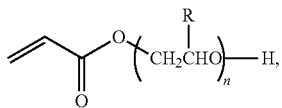

wherein R is selected from H, methyl, or ethyl and n is a number from 1 to 10.

In some embodiments, the α,β-unsaturated ester is selected from the group consisting of an ethoxylated ester, a propoxylated ester, an acrylate ester, and any combination thereof. The α,β-unsaturated ester may also be selected from the group consisting of a mono-ethoxylate of acrylic acid, a di-ethoxylate of acrylic acid, a tri-ethoxylate of acrylic acid, a mono-propoxylate of acrylic acid, a di-propoxylate of acrylic acid, a tri-propoxylate of acrylic acid, and any combination thereof. The α,β-unsaturated ester may also be selected from the group consisting of methyl acrylate, ethyl acrylate, propyl acrylate, butyl acrylate, propyl hydroxyl ester, hydroxyl butyl acrylate, hydroxyl ethyl acrylate, and any combination thereof.

In some embodiments, the formaldehyde equivalent comprises an alkyl hemiformal compound and/or an alkanol hemiformal compound. The formaldehyde equivalent may comprise the following structure:

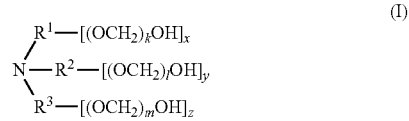

wherein $R^1$, $R^2$, and $R^3$ are each independently selected from the group consisting of hydrogen, alkylenyl, alkenylenyl, alkynylenyl, alkyl, alkenyl, and alkynyl, wherein said alkylenyl, alkenylenyl, alkynylenyl, alkyl, alkenyl, and alkynyl are each independently, at each occurrence, substituted or unsubstituted with one or more suitable substituents;

wherein k, l, and m are each independently an integer selected from the group consisting of 0 to 25, wherein k+l+m is >0; and wherein x, y, and z are each independently an integer selected from the group consisting of 0 and 1, wherein x+y+z is 1, 2, or 3;

provided that:

when x is 0, $R^1$ is hydrogen, alkyl, alkenyl, or alkynyl; and when x is 1, $R^1$ is alkylenyl, alkenylenyl, or alkynylenyl;

when y is 0, $R^2$ is hydrogen, alkyl, alkenyl, or alkynyl; and when y is 1, $R^2$ is alkylenyl, alkenylenyl, or alkynylenyl;

when z is 0, $R^3$ is hydrogen, alkyl, alkenyl, or alkynyl; and when z is 1, $R^3$ is alkylenyl, alkenylenyl, or alkynylenyl; and when x is 1, y is 1, z is 1, k is 1, l is 1, and m is 1, then $R^1$, $R^2$, and $R^3$ are not simultaneously unsubstituted $C_2$-alkylenyl.

In some embodiments, x+y+z is 3, and $R^2$, and $R^3$ are each selected from the group consisting of alkylenyl, $C_2$-alkylenyl, unsubstituted $C_2$-alkylenyl, and any combination thereof. In some embodiments, x is 1, y is 1, z is 0, $R^1$ and $R^2$ are each alkylenyl, and $R^3$ is alkyl. In some embodiments, x is 1, y is 1, z is 0, $R^1$ and $R^2$ are each alkylenyl, and $R^3$ is hydrogen.

In certain embodiments, the formaldehyde equivalent comprises the following formula (II),

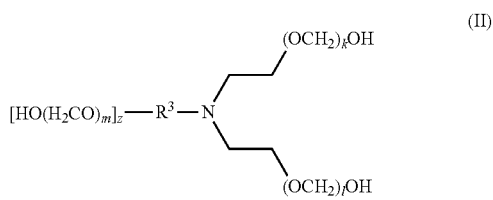

wherein $R^3$ is selected from the group consisting of hydrogen, alkylenyl, alkenylenyl, alkynylenyl, alkyl, alkenyl, and alkynyl, wherein said alkylenyl, alkenylenyl, alkynylenyl, alkyl, alkenyl, and alkynyl are each independently substituted or unsubstituted with one or more suitable substituents;

wherein k, l, and m are each independently an integer selected from the group consisting of 0 to 25, wherein k+l+m is >0; and wherein z is 0 or 1;
provided that:
when z is 1, $R^3$ is alkylenyl, alkenylenyl, or alkynylenyl;
when z is 0, $R^3$ is hydrogen, alkyl, alkenyl, or alkynyl; and
when z is 1, k is 1, 1 is 1, and m is 1, then $R^3$ is not an unsubstituted $C_2$-alkylenyl.

In some embodiments, the compositions comprise a polymerization inhibitor, optionally wherein the polymerization inhibitor is an anaerobic polymerization inhibitor. The polymerization inhibitor may comprise a member selected from the group consisting of 4-hydroxy-2,2,6,6-tetramethyl piperidinoxyl (HTMPO), phenothiazine, and any combination thereof.

In some embodiments, the composition comprises from about 1 to about 35 weight % of the Michael acceptor and about 1 to about 80 weight % of the formaldehyde and/or formaldehyde equivalent. The composition may also comprise from about 1 to about 35 weight % of the Michael acceptor, from about 1 to about 80 weight % of the formaldehyde or formaldehyde equivalent, and from about 10 ppm to about 10,000 ppm of the polymerization inhibitor. Further, the composition may comprise from about 1 to about 20 weight % of triethanolamine.

In some embodiments, the composition comprises the formaldehyde equivalent and further comprises a glycol ether solvent, triethanolamine, and hydroxyl ethyl acrylate, wherein the formaldehyde equivalent is an alkanol hemiformal. In some embodiments, the composition comprises the formaldehyde and further comprises water and optionally methanol.

In some embodiments, the composition is anhydrous.

The present disclosure also provides methods of scavenging hydrogen sulfide. The methods may comprise adding any composition disclosed herein to a fluid or gas comprising the hydrogen sulfide and allowing the composition to react with the hydrogen sulfide, thereby scavenging the hydrogen sulfide.

Additionally, the present disclosure provides for the use of a composition for scavenging hydrogen sulfide, the composition comprising a Michael acceptor and a scavenging compound, wherein the scavenging compound comprises formaldehyde and/or a formaldehyde equivalent, and wherein the Michael acceptor comprises an α,β-unsaturated ester.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which:

FIG. 1 shows performance data of a formulation according to certain embodiments of the present disclosure.

DETAILED DESCRIPTION

Disclosed herein are hydrogen sulfide and/or mercaptan scavenging and antifouling compositions, methods of using those compositions, and processes for their preparation. The compositions are useful in the control of hydrogen sulfide and/or mercaptan emissions from crude oil based, natural gas based, and coal based products and processes. The compositions are particularly useful in preventing solid deposits in process equipment used for scavenging hydrogen sulfide and/or mercaptan chemicals. The compositions are applicable to both upstream and downstream processes. The scavenging compositions, optionally blended with aqueous and/or non-aqueous solvents, are useful in a wide range of climates and under a wide range of process conditions.

The disclosed processes for preparing the compositions are economic, waste free, and provide the compounds in quantitative yields. The compositions can optionally be blended with hydrophilic solvents (e.g., alcohols, glycol, polyols) for non-aqueous applications. Alternatively, the compositions may be blended with an aqueous phase for direct use in aqueous applications.

The compositions provide further economic advantages through reduced transportation costs due to increased actives concentration, and through increased production capacity. The compositions also considerably lower the water washable nitrogen content to eliminate nitrogen contamination of refinery catalyst beds. The compositions also provide the ability to manufacture the products at most locations without offensive odor emanating from raw materials. The compositions, when in contact with hydrogen sulfide, produce reaction product waste that can be added directly to waste water; whereas, processes that employ the hydrogen sulfide scavenger triazine require expensive hazardous waste removal.

The compositions prevent the reaction product waste from forming solid deposits in the tower, pipeline, or the like; thereby prolonging equipment operation time and improving $H_2S$ removal. Without being bound by theory, solid deposits form, for example, from the formation of polymethylene sulfide in the reaction product waste. Solid deposit formation leads to clogging requiring process interruption for solids removal and cleaning.

The compounds comprising α,β-unsaturated esters (as opposed to α,β-unsaturated acids) have no effect on the pH of the compositions. Further, the compositions comprising α,β-unsaturated esters display improved storage life, due at least in part to the esters being more stable than the acids.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

The term "suitable substituent," as used herein, is intended to mean a chemically acceptable functional group, preferably a moiety that does not negate the hydrogen sulfide scavenging activity of the inventive compounds. Such suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C=O)— groups, heterocyclic groups, cycloalkyl groups, amino groups, alkyl—and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups, groups of formula —(OCH$_2$)$_t$OH wherein t is 1 to 25, and groups of formula -alkylenyl-(OCH$_2$)$_t$OH wherein t is 1 to 25. Those skilled in the art will appreciate that many substituents can be substituted by additional substituents.

The term "alkyl," as used herein, refers to a linear or branched hydrocarbon radical, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons). Alkyl groups include, but are not limited to, methyl, ethyl, n-propyl, isopropyl, n-butyl, iso-butyl, secondary-butyl, and tertiary-butyl. Alkyl groups may be unsubstituted or substituted by one or more suitable substituents, as defined above.

The term "alkylenyl" or "alkylene," as used herein, refers to a divalent group derived from a saturated, straight or branched hydrocarbon chain of from 1 to 32 carbon atoms. The term "C$_1$-C$_6$ alkylene" means those alkylene or alkylenyl groups having from 1 to 6 carbon atoms. Representative examples of alkylenyl groups include, but are not limited to, —CH$_2$—, CH(CH$_3$)—, —CH(C$_2$H$_5$)—, —CH(CH(CH$_3$)(C$_2$H$_5$))—, —C(H)(CH$_3$)CH$_2$CH$_2$—, —C(CH$_3$)$_2$—, —CH$_2$CH$_2$—, —CH$_2$CH$_2$CH$_2$—, —CH$_2$CH$_2$CH$_2$CH$_2$—, and —CH$_2$CH(CH$_3$)CH$_2$—. Alkylenyl groups may be unsubstituted or substituted by one or more suitable substituents, as defined above.

The term "alkenyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups may be unsubstituted or substituted by one or more suitable substituents, as defined above.

The term "alkenylenyl" or "alkenylene," as used herein, refers to a divalent group derived from a straight or branched chain hydrocarbon of 2 to 32 carbon atoms, which contains at least one carbon-carbon double bond. Representative examples of alkenylenyl groups include, but are not limited to, —C(H)=C(H)—, —C(H)=C(H)—CH$_2$—, —C(H)=C(H)—CH$_2$—CH$_2$—, —CH$_2$—C(H)=C(H)—CH$_2$—, —C(H)=C(H)—CH(CH$_3$)—, and —CH$_2$—C(H)=C(H)—CH(CH$_2$CH$_3$)—. Alkenylenyl groups may be unsubstituted or substituted by one or more suitable substituents, as defined above.

The term "alkynyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon triple bonds. Alkynyl groups include, but are not limited to, ethynyl, propynyl, and butynyl. Alkynyl groups may be unsubstituted or substituted by one or more suitable substituents, as defined above.

The term "alkynylenyl" or "alkynylene," as used herein, refers to a divalent unsaturated hydrocarbon group which may be linear or branched and which has at least one carbon-carbon triple bond. Representative examples of alkynylenyl groups include, but are not limited to, —C≡C—, —C≡C—CH$_2$—, —C≡C—CH$_2$—CH$_2$—, —CH$_2$—C≡C—CH$_2$—, —C≡C≡CH(CH$_3$)—, and —CH$_2$—C≡C—CH(CH$_2$CH$_3$)—. Alkynylenyl groups may be unsubstituted or substituted by one or more suitable substituents, as defined above.

The term "alkoxy," as used herein, refers to an alkyl group, as defined herein, appended to the parent molecular moiety through an oxygen atom.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above.

The term "carbonyl," "(C=O)," or "—C(O)—" (as used in phrases such as alkylcarbonyl, alkyl—(C=O)— or alkoxycarbonyl) refers to the joinder of the >C=O moiety to a second moiety such as an alkyl or amino group (i.e. an amido group). Alkoxycarbonylamino (i.e. alkoxy(C=O)—NH—) refers to an alkyl carbamate group. The carbonyl group is also equivalently defined herein as (C=O). Alkylcarbonylamino refers to groups such as acetamide.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

The term "formaldehyde equivalent" as used herein refers to the hemi-formyl reaction product obtained by reacting formalin or para-formaldehyde with an alcohol or a poly alcohol (such as diol or triol).

The term "halo" or "halogen," as used herein, refers to a fluoro, chloro, bromo or iodo radical.

The term "heteroaryl," as used herein, refers to a monocyclic, bicyclic, or tricyclic aromatic heterocyclic group containing one or more heteroatoms selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2,3-oxadiazolyl), thiadiazolyl (e.g., 1,3,4-thiadiazolyl), quinolyl, isoquinolyl, benzothienyl, benzofuryl, and indolyl. Heteroaryl groups may be unsubstituted or substituted by one or more suitable substituents, preferably 1 to 5 suitable substituents, as defined above.

The term "heterocycle," as used herein, refers to a monocyclic, bicyclic, or tricyclic group containing 1 to 4 heteroatoms selected from N, O, $S(O)_t$, $P(O)_n$, $PR^x$, NH or $NR^x$, wherein $R^x$ is a suitable substituent. Heterocyclic groups optionally contain 1 or 2 double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydro-thiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidine, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazin-yl, morpholin-yl, 1,2-tetrahydrodiazin-2-yl, 1,3-tetrahydrodiazin-1-yl, 1,4-oxazin-2-yl, and 1,2,5-oxathiazin-4-yl. Heterocyclic groups may be unsubstituted or substituted by one or more suitable substituents, preferably 1 to 3 suitable substituents, as defined above.

The term "hydroxy," as used herein, refers to an —OH group.

The term "oxo," as used herein, refers to a double bonded oxygen (=O) radical wherein the bond partner is a carbon atom. Such a radical can also be thought as a carbonyl group.

The term "counterion," as used herein, means a halide (e.g., fluoride, chloride, bromide, iodide), a carboxylate anion, such as selected from deprotonation of mineral acid, acrylic acid, acetic acid, methacrylic acid, glycolic acid, thioglycolic acid, propionic acid, butyric acid, and the like, or any other anionic constituent that satisfies the charge balance necessary to form a neutral molecule.

The term "sweetening," as used herein, may refer to a process that removes sulfur species from a gas or liquid. The sulfur species may include hydrogen sulfide and mercaptans.

The term "sour gas," as used herein, may refer to a gas that includes significant amounts of sulfur species, such as hydrogen sulfide and/or mercaptans.

The term "sour liquid" or "sour fluid," as used herein, may refer to a liquid that includes significant amounts of sulfur species, such as hydrogen sulfide and/or mercaptans.

The term "water cut," as used herein, means the percentage of water in a composition containing an oil and water mixture.

Useful compounds that can be used in the compositions include scavengers of sulfur-based species such as hydrogen sulfide and mercaptans. The compounds may be particularly useful in the oil, gas, and coal industries. The compositions may comprise aqueous solutions and in other embodiments, the compositions may comprise anhydrous formulations. For example, in some embodiments, the compositions comprise aqueous formaldehyde. The compositions may also comprise any scavenger (or Michael acceptor) disclosed in United States Patent Application Publication No. 2018/0030360, the contents of which are expressly incorporated by reference into the present application in their entirety.

In some embodiments, the scavenging compounds may comprise formaldehyde or formaldehyde equivalents, such as alkyl hemiformals. In certain embodiments, the scavenging compounds may comprise formalin. In some embodiments, the scavenging compounds may comprise alkanol hemiformal compounds, which include hemiformal compounds made from alcohols, diols, and/or triols. As examples, the alcohol may comprise 2-ethyl hexanol, the diol may comprise glycol, and the triol may comprise glycerin/glycerol. The alkanol hemiformal compounds may be reaction products of glycerin and paraformaldehyde.

In some embodiments, the compounds may comprise alkanolamine formaldehyde addition products. The alkanolamine formaldehyde addition products may be provided in anhydrous or hydrous form.

In one aspect, useful compounds in the compositions are of formula (I),

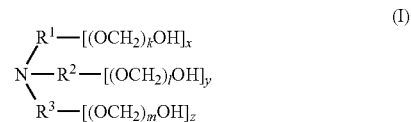

wherein $R^1$, $R^2$, and $R^3$ are each independently selected from the group consisting of hydrogen, alkylenyl, alkenylenyl, alkynylenyl, alkyl, alkenyl, and alkynyl, wherein said alkylenyl, alkenylenyl, alkynylenyl, alkyl, alkenyl, and alkynyl are each independently, at each occurrence, substituted or unsubstituted with one or more suitable substituents; k, l, and m are each independently an integer selected from the group consisting of 0 to 25, wherein k+l+m is >0; and x, y, and z are each independently an integer selected from the group consisting of 0 and 1, wherein x+y+z is 1, 2, or 3.

In some embodiments, when x is 0, $R^1$ is hydrogen, alkyl, alkenyl, or alkynyl; and when x is 1, $R^1$ is alkylenyl, alkenylenyl, or alkynylenyl. In some embodiments, when y is 0, $R^2$ is hydrogen, alkyl, alkenyl, or alkynyl; and when y is 1, $R^2$ is alkylenyl, alkenylenyl, or alkynylenyl. In some embodiments, when z is 0, $R^3$ is hydrogen, alkyl, alkenyl, or alkynyl; and when z is 1, $R^3$ is alkylenyl, alkenylenyl, or alkynylenyl.

It is to be understood that when x is 0, $[(OCH_2)_kOH]$ is absent; when y is 0, $[(OCH_2)_lOH]$ is absent; and when z is 0, $[(OCH_2)_mOH]$ is absent. It is also to be understood that when $R^1$ is alkylenyl, alkenylenyl, or alkynylenyl, then x must be 1; when $R^1$ is hydrogen, alkyl, alkenyl, or alkynyl, then x must be 0; when $R^2$ is alkylenyl, alkenylenyl, or alkynylenyl, then y must be 1; when $R^2$ is hydrogen, alkyl, alkenyl, or alkynyl, then y must be 0; when $R^3$ is alkylenyl, alkenylenyl, or alkynylenyl, then z must be 1; and when $R^3$ is hydrogen, alkyl, alkenyl, or alkynyl, then z must be 0.

It is also to be understood that when k>0, then x must be 1; when l>0, then y must be 1; and when m is >0, then z must be 1.

In certain embodiments, one or more of $R^1$, $R^2$, and $R^3$ are straight chain alkylenyl. In certain embodiments, one or more of $R^1$, $R^2$, and $R^3$ are branched alkylenyl. In certain embodiments, one or more of $R^1$, $R^2$, and $R^3$ are unsubstituted alkylenyl. In certain embodiments, one or more of $R^1$, $R^2$, and $R^3$ are substituted alkylenyl. In certain embodiments, one or more of $R^2$, and $R^3$ are straight chain, unsubstituted alkylenyl. In certain embodiments, one or more of $R^1$, $R^2$, and $R^3$ are straight chain, substituted alkylenyl. In certain embodiments, one or more of $R^1$, $R^2$, and $R^3$ are branched, unsubstituted alkylenyl. In certain embodiments, one or more of $R^1$, $R^2$, and $R^3$ are branched, substituted alkylenyl.

In certain embodiments, $R^2$, and $R^3$ are each straight chain alkylenyl. In certain embodiments, $R^1$, $R^2$, and $R^3$ are each branched alkylenyl. In certain embodiments, $R^1$, $R^2$, and $R^3$ are each unsubstituted alkylenyl. In certain embodiments, $R^1$, $R^2$, and $R^3$ are each substituted alkylenyl. In certain embodiments, $R^1$, $R^2$, and $R^3$ are each straight chain, unsubstituted alkylenyl. In certain embodiments, $R^2$, and $R^3$ are each straight chain, substituted alkylenyl. In certain embodiments, $R^1$, $R^2$, and $R^3$ are each branched, unsubstituted alkylenyl. In certain embodiments, $R^1$, $R^2$, and $R^3$ are each branched, substituted alkylenyl.

In certain embodiments, $R^1$, $R^2$, and $R^3$ are each $C_1$-$C_{32}$-alkylenyl. In certain embodiments, $R^1$, $R^2$, and $R^3$ are each $C_1$-$C_{24}$-alkylenyl. In certain embodiments, $R^1$, $R^2$, and $R^3$ are each $C_1$-$C_{10}$ alkylenyl. In certain embodiments, $R^2$, and $R^3$ are each $C_1$-$C_6$-alkylenyl.

In certain embodiments, one or more of $R^1$, $R^2$, and $R^3$ are $C_1$-alkylenyl. In certain embodiments, one or more of $R^1$, $R^2$, and $R^3$ are unsubstituted $C_1$-alkylenyl. In certain embodiments, one or more of $R^1$, $R^2$, and $R^3$ are substituted $C_1$-alkylenyl. In certain embodiments, one or more of $R^2$, and $R^3$ are $C_2$-alkylenyl. In certain embodiments, one or more of $R^1$, $R^2$, and $R^3$ are unsubstituted $C_2$-alkylenyl. In certain embodiments, one or more of $R^1$, $R^2$, and $R^3$ are substituted $C_2$-alkylenyl. In certain embodiments, one or more of $R^1$, $R^2$, and $R^3$ are $C_3$-alkylenyl. In certain embodiments, one or more of $R^1$, $R^2$, and $R^3$ are unsubstituted $C_3$-alkylenyl. In certain embodiments, one or more of $R^2$, and $R^3$ are substituted $C_3$-alkylenyl. In certain embodiments, one or more of $R^1$, $R^2$, and $R^3$ are $C_4$-alkylenyl. In certain embodiments, one or more of $R^2$, and $R^3$ are unsubstituted $C_4$-alkylenyl. In certain embodiments, one or more of $R^1$, $R^2$, and $R^3$ are substituted $C_4$-alkylenyl. In certain embodiments, one or more of $R^2$, and $R^3$ are $C_5$-alkylenyl. In certain embodiments, one or more of $R^1$, $R^2$, and $R^3$ are unsubstituted $C_5$-alkylenyl. In certain embodiments, one or more of $R^1$, $R^2$, and $R^3$ are substituted $C_5$-alkylenyl. In certain embodiments, one or more of $R^2$, and $R^3$ are $C_6$-alkylenyl. In certain embodiments, one or more of $R^1$, $R^2$, and $R^3$ are unsubstituted $C_6$-alkylenyl. In certain embodiments, one or more of $R^1$, $R^2$, and $R^3$ are substituted $C_6$-alkylenyl.

In certain embodiments, $R^1$, $R^2$, and $R^3$ are each $C_1$-alkylenyl. In certain embodiments, $R^2$, and $R^3$ are each unsubstituted $C_1$-alkylenyl. In certain embodiments, $R^2$, and $R^3$ are each substituted $C_1$-alkylenyl. In certain embodiments, $R^1$, $R^2$, and $R^3$ are each $C_2$-alkylenyl. In certain embodiments, $R^1$, $R^2$, and $R^3$ are each unsubstituted $C_2$-alkylenyl. In certain embodiments, $R^1$, $R^2$, and $R^3$ are each substituted $C_2$-alkylenyl. In certain embodiments, $R^1$, $R^2$, and $R^3$ are each $C_3$-alkylenyl. In certain embodiments, $R^2$, and $R^3$ are each unsubstituted $C_3$-alkylenyl. In certain embodiments, $R^1$, $R^2$, and $R^3$ are each substituted $C_3$-alkylenyl. In certain embodiments, $R^2$, and $R^3$ are each $C_4$-alkylenyl. In certain embodiments, $R^1$, $R^2$, and $R^3$ are each unsubstituted $C_4$-alkylenyl. In certain embodiments, $R^1$, $R^2$, and $R^3$ are each substituted $C_4$-alkylenyl. In certain embodiments, $R^2$, and $R^3$ are each $C_5$-alkylenyl. In certain embodiments, $R^1$, $R^2$, and $R^3$ are each unsubstituted $C_5$-alkylenyl. In certain embodiments, $R^1$, $R^2$, and $R^3$ are each substituted $C_5$-alkylenyl. In certain embodiments, $R^1$, $R^2$, and $R^3$ are each $C_6$-alkylenyl. In certain embodiments, $R^1$, $R^2$, and $R^3$ are each unsubstituted $C_6$-alkylenyl. In certain embodiments, $R^1$, $R^2$, and $R^3$ are each substituted $C_6$-alkylenyl.

In certain embodiments, when x is 1, y is 1, z is 1, k is 1, l is 1, and m is 1, then $R^1$, $R^2$, and $R^3$ are not simultaneously unsubstituted $C_2$-alkylenyl.

In certain embodiments, $R^1$ and $R^2$ are alkylenyl, and $R^3$ is alkyl. In certain embodiments, $R^1$ and $R^2$ are unsubstituted alkylenyl, and $R^3$ is unsubstituted alkyl. In certain embodiments, $R^1$ and $R^2$ are substituted alkylenyl, and $R^3$ is unsubstituted alkyl. In certain embodiments, $R^1$ and $R^2$ are substituted alkylenyl, and $R^3$ is substituted alkyl. In certain embodiments, $R^1$ and $R^2$ are unsubstituted alkylenyl, and $R^3$ is substituted alkyl.

In certain embodiments, $R^1$ and $R^2$ are $C_1$-$C_{32}$, $C_1$-$C_{16}$, $C_1$-$C_{10}$, or $C_1$-$C_6$ alkylenyl, and $R^3$ is $C_1$-$C_{32}$, $C_1$-$C_{10}$, or $C_1$-$C_6$ alkyl. In certain embodiments, $R^1$ and $R^2$ are unsubstituted $C_1$-$C_{32}$, $C_1$-$C_{10}$, or $C_1$-$C_6$ alkylenyl, and $R^3$ is unsubstituted $C_1$-$C_{32}$, $C_1$-$C_{10}$, or $C_1$-$C_6$ alkyl. In certain embodiments, $R^1$ and $R^2$ are unsubstituted $C_2$-alkylenyl, and $R^3$ is unsubstituted $C_1$-alkyl. In certain embodiments, $R^1$ and $R^2$ are unsubstituted $C_2$-alkylenyl, and $R^3$ is unsubstituted $C_2$-alkyl.

In certain embodiments, $R^1$ and $R^2$ are alkylenyl, and $R^3$ is hydrogen. In certain embodiments, $R^1$ and $R^2$ are unsubstituted alkylenyl, and $R^3$ is hydrogen. In certain embodiments, $R^1$ and $R^2$ are unsubstituted $C_2$-alkylenyl, and $R^3$ is hydrogen. In certain embodiments, $R^1$ and $R^2$ are substituted alkylenyl, and $R^3$ is hydrogen. In certain embodiments, $R^1$ and $R^2$ are substituted $C_2$-alkylenyl, and $R^3$ is hydrogen.

In certain embodiments, one or more of $R^1$, $R^2$, and $R^3$ are substituted with one or more suitable substituents selected from hydroxy, groups of formula —(OCH$_2$)$_t$OH wherein t is 1 to 25, and groups of formula -alkylenyl-(OCH$_2$)$_t$OH wherein t is 1 to 25.

In certain embodiments, k is 0 to 25, l is 0 to 25, and m is 0 to 25, provided that k+l+m is >0. In certain embodiments, k is 1 to 25, l is 1 to 25, and m is 1 to 25. In certain embodiments, k is 1 to 20, l is 1 to 20, and m is 1 to 20. In certain embodiments, k is 1 to 13, l is 1 to 13, and m is 1 to 13. In certain embodiments, k is 1 to 10, l is 1 to 10, and m is 1 to 10.

In certain embodiments, k+l+m ranges from 1 to 25. In certain embodiments, k+l+m ranges from 1 to 13. In certain embodiments, k+l+m ranges from 1 to 10. In certain embodiments, k+l+m is 1, 2, 3, 4, 5, 6, 7, 8, 9, 10, 11, 12, 13, 14, 15, 16, 17, 18, 19, 20, 21, 22, 23, 24, or 25.

In certain embodiments, x is 1, y is 1, and z is 1. In certain embodiments, x is 1, y is 1, and z is 0. In certain embodiments, x is 1, y is 0, and z is 1. In certain embodiments, x is 0, y is 1, and z is 1. In certain embodiments, x is 1, y is 0, and z is 0. In certain embodiments, x is 0, y is 1, and z is 0. In certain embodiments, x is 0, y is 0, and z is 1.

In certain embodiments, a compound has formula (II), wherein $R^3$ is selected from the group consisting of hydrogen, alkylenyl, alkenylenyl, alkynylenyl, alkyl, alkenyl, and alkynyl, wherein said alkylenyl, alkenylenyl, alkynylenyl, alkyl, alkenyl, and alkynyl are each independently substituted or unsubstituted with one or more suitable substituents; wherein k, l, and m are each independently an integer selected from the group consisting of 0 to 25, wherein k+l+m>0; and wherein z is 0 or 1; provided that when z is 1, $R^3$ is alkylenyl, alkenylenyl, or alkynylenyl; provided that when z is 0, $R^3$ is hydrogen, alkyl, alkenyl, or alkynyl.

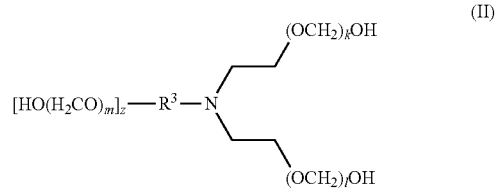

It is to be understood that when z is 0, [HO(H₂CO)$_m$] is absent. It is also understood that when m is >0, then z must be 1. In certain embodiments, when z is 1, k is 1, and l is 1, then $R^3$ is not an unsubstituted $C_2$-alkylenyl. In certain embodiments, z is 1 and $R^3$ is alkylenyl. In certain embodiments, z is 1 and $R^3$ is $C_2$-alkylenyl. In certain embodiments, z is 1 and $R^3$ is unsubstituted $C_2$-alkylenyl. In certain embodiments, z is 0 and $R^3$ is alkyl. In certain embodiments, z is 0 and $R^3$ is $C_1$-alkyl. In certain embodiments, z is 0 and $R^3$ is unsubstituted $C_1$-alkyl. In certain embodiments, z is 0 and $R^3$ is hydrogen. In certain embodiments, k is 0 to 25, l is 0 to 25, and m is 0 to 25. In certain embodiments, k is 1 to 25, l is 1 to 25, and m is 1 to 25. In certain embodiments, k is 1 to 20, l is 1 to 20, and m is 1 to 20. In certain embodiments, k is 1 to 13, l is 1 to 13, and m is 1 to 13. In certain embodiments, k is 1 to 10, l is 1 to 10, and m is 1 to 10. In certain embodiments, k+l+m ranges from 1 to 25. In certain embodiments, k+l+m ranges from 1 to 13. In certain embodiments, k+l+m ranges from 1 to 10. In certain embodiments, k+l+m is 1, 2, 3, 4, 5, 6, 7, 8, 9, 10, 11, 12, 13, 14, 15, 16, 17, 18, 19, 20, 21, 22, 23, 24, or 25. In certain embodiments, when z is 1, k is 1, l is 1, and m is 1, then $R^3$ is not an unsubstituted $C_2$-alkylenyl.

In certain embodiments, a compound has formula (III), wherein k is 0 to 25, l is 0 to 25, and m is 0 to 25, provided that k+l+m is >0. In certain embodiments, k is 1 to 25, l is 1 to 25, and m is 1 to 25. In certain embodiments, k is 1 to 20, l is 1 to 20, and m is 1 to 20. In certain embodiments, k is 1 to 13, l is 1 to 13, and m is 1 to 13. In certain embodiments, k is 1 to 10, l is 1 to 10, and m is 1 to 10. In certain embodiments, k+l+m ranges from 1 to 25. In certain embodiments, k+l+m ranges from 1 to 13. In certain embodiments, k+l+m ranges from 1 to 10. In certain embodiments, k+l+m is 1, 2, 3, 4, 5, 6, 7, 8, 9, 10, 11, 12, 13, 14, 15, 16, 17, 18, 19, 20, 21, 22, 23, 24, or 25. In certain embodiments, k, l, and m are not simultaneously 1.

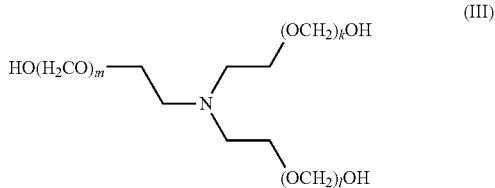

In certain embodiments, a compound has formula (IV), wherein $R^3$ is hydrogen, alkyl, alkenyl, or alkynyl, wherein said alkyl, alkenyl, and alkynyl are each independently substituted or unsubstituted with one or more suitable substituents, and wherein k and l are each independently an integer selected from the group consisting of 0 to 25, provided that k+l is >0. In certain embodiments, $R^3$ is alkyl. In certain embodiments, $R^3$ is unsubstituted $C_1$-alkyl or unsubstituted $C_2$-alkyl. In certain embodiments, $R^3$ is hydrogen. In certain embodiments, k is 1 to 25, and l is 1 to 25. In certain embodiments, k is 1 to 20, and l is 1 to 20. In certain embodiments, k is 1 to 13, and l is 1 to 13. In certain embodiments, k is 1 to 10, and l is 1 to 10. In certain embodiments, k+l ranges from 1 to 25. In certain embodiments, k+l ranges from 1 to 13. In certain embodiments, k+l ranges from 1 to 10. In certain embodiments, k+l is 1, 2, 3, 4, 5, 6, 7, 8, 9, 10, 11, 12, 13, 14, 15, 16, 17, 18, 19, 20, 21, 22, 23, 24, or 25.

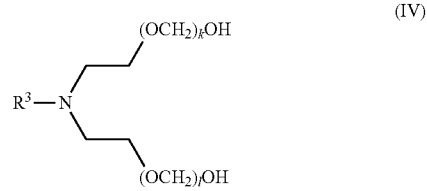

In certain embodiments, a compound has formula (V), wherein k and l are each independently an integer selected from the group consisting of 0 to 25, provided that k+l is >0. In certain embodiments, k is 1 to 25, and l is 1 to 25. In certain embodiments, k is 1 to 20, and l is 1 to 20. In certain embodiments, k is 1 to 13, and l is 1 to 13. In certain embodiments, k is 1 to 10, and l is 1 to 10. In certain embodiments, k+l ranges from 1 to 25. In certain embodiments, k+l ranges from 1 to 13. In certain embodiments, k+l ranges from 1 to 10. In certain embodiments, k+l is 1, 2, 3, 4, 5, 6, 7, 8, 9, 10, 11, 12, 13, 14, 15, 16, 17, 18, 19, 20, 21, 22, 23, 24, or 25.

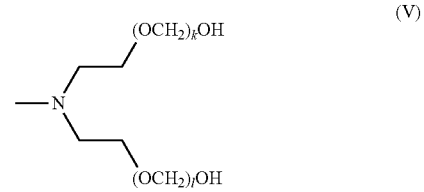

In certain embodiments, a compound has formula (VI), wherein k and l are each independently an integer selected from the group consisting of 0 to 25, provided that k+l is >0. In certain embodiments, k is 1 to 25, and l is 1 to 25. In certain embodiments, k is 1 to 20, and l is 1 to 20. In certain embodiments, k is 1 to 13, and l is 1 to 13. In certain embodiments, k is 1 to 10, and l is 1 to 10. In certain embodiments, k+l ranges from 1 to 25. In certain embodiments, k+l ranges from 1 to 13. In certain embodiments, k+l ranges from 1 to 10. In certain embodiments, k+l is 1, 2, 3, 4, 5, 6, 7, 8, 9, 10, 11, 12, 13, 14, 15, 16, 17, 18, 19, 20, 21, 22, 23, 24, or 25.

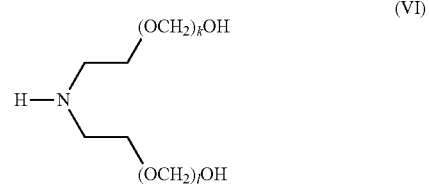

In certain embodiments, a compound has formula (VII), wherein $R^3$, m, and z are as defined above.

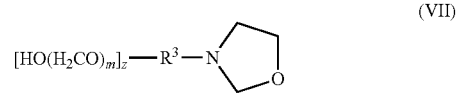

The compounds may contain asymmetric centers and can thus occur as racemates and racemic mixtures, single enantiomers, diastereomeric mixtures and individual diastereomers. Additional asymmetric centers may be present depending upon the nature of the various substituents on the molecule. Each such asymmetric center will independently produce two optical isomers and it is intended that all of the possible optical isomers and diastereomers in mixtures and as pure or partially purified compounds are included within the scope of this invention.

In accordance with the present disclosure, Michael acceptors refer to α,β-unsaturated electrophiles that may include, but are not limited to, α,β-unsaturated esters, α,β-unsaturated carbonyls, α,β-unsaturated nitriles, α,β-unsaturated aldehydes, α,β-unsaturated carboxylic acids, quinones, and α,β-unsaturated sulfones. The Michael acceptor may include any vinyl derivative substituted with an electron-withdrawing group, such as, but not limited to, a nitro group.

The present inventors discovered that the Michael acceptors disclosed herein completely remove the reaction product of polymethylene sulfide during hydrogen sulfide scavenging procedures. This discovery works in the presence, and in the absence, of water.

In some embodiments, the Michael acceptor comprises one or more α,β-unsaturated esters, such as an ethoxylated ester, a propoxylated ester, etc. In certain embodiments, the Michael acceptor comprises an acrylate ester, such as methyl acrylate, ethyl acrylate, propyl acrylate, butyl acrylate, etc. In some embodiments, the Michael acceptor comprises a mono-ethoxylate, di-ethoxylate, or tri-ethoxylate of acrylic acid or a mono-propoxylate, di-propoxylate, or tri-propoxylate of acrylic acid. Specific examples include, but are not limited to, hydroxyl butyl acrylate (CAS No. 2421-27-4), propyl hydroxyl ester (CAS No. 999-61-1), hydroxyl ethyl acrylate (HEA) (CAS No. 818-61-1), and any combination thereof.

In some embodiments, an α,β-unsaturated acid may be reacted with an alcohol to obtain an acrylic ester that may be used as the Michael acceptor. An α,β-unsaturated acid may be reacted with ethylene oxide to obtain a monoethoxylate, an α,β-unsaturated acid may be reacted with propylene oxide to obtain a diethoxylate, or an α,β-unsaturated acid may be reacted with butylene oxide to obtain a triethoxylate. For example, reacting 1 mol of an α,β-unsaturated acid with propylene oxide produces a monopropoxylate, reacting 2 moles of an α,β-unsaturated acid with propylene oxide produces a dipropoxylate, and reacting 3 moles of an α,β-unsaturated acid with propylene oxide produces a tripropoxylate.

In some embodiments, the Michael acceptor comprises the following structure:

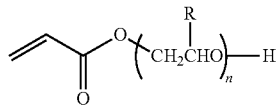

In the structure shown above, "R" is selected from H, methyl, or ethyl and "n" is a number from 1 to 10.

The compositions disclosed herein comprise one or more Michael acceptors and at least one scavenging compound as described above. In some embodiments, the compositions further comprise a polymerization inhibitor. In some embodiments, the polymerization inhibitor is an anaerobic polymerization inhibitor. The polymerization inhibitor may inhibit polymerization of the Michael acceptor. When the composition comprises a polymerization inhibitor, the composition may comprise less of the Michael acceptor than it would if it did not comprise the polymerization inhibitor, thereby making the composition more economical. In some embodiments, the polymerization inhibitor is a compound containing an amine functional group. In certain embodiments, the polymerization inhibitor is a derivative of tetramethylpiperidine. In some embodiments, the polymerization inhibitor comprises a member selected from the group consisting of 4-hydroxy-2,2,6,6-tetramethyl piperidinoxyl (HTMPO) and phenothiazine (CAS No. 92-84-2).

In some embodiments, the compositions comprise from about 10 ppm to about 10,000 ppm of the polymerization inhibitor. In some embodiments, the compositions comprise from about 200 ppm to about 500 ppm of the polymerization inhibitor.

The compositions disclosed herein include one or more Michael acceptors and at least one scavenging compound as described above. In some embodiments, the composition comprises a Michael acceptor and formaldehyde. In some embodiments, the composition comprises formalin and a Michael acceptor. In certain embodiments, the composition comprises a formaldehyde equivalent and a Michael acceptor. In some embodiments, the composition comprises formaldehyde and/or a formaldehyde equivalent, a Michael acceptor, optionally a polymerization inhibitor, optionally a solvent, and optionally triethanolamine.

In some embodiments, a composition contains a Michael acceptor and a compound of formula (I). In other embodiments, a composition contains a Michael acceptor and a mixture of two or more structurally distinct compounds of formula (I). In certain embodiments, a composition may comprise a Michael acceptor and a mixture of compounds of formula (I), wherein k, l, and/or m are variable, and/or wherein $R^1$, $R^2$, and/or $R^3$ are variable, and/or wherein x, y, and/or z are variable.

In some embodiments, the composition comprises formaldehyde and/or a formaldehyde equivalent, a Michael acceptor, and the composition may contain or may not contain other additives or compounds as set forth in this disclosure.

In certain embodiments, a composition contains a Michael acceptor and a mixture of compounds of formula (I) wherein $R^1$, $R^2$, and $R^3$ are the same across the compounds of formula (I) in the composition, respectively, and k, l, and m are optionally variable across the compounds of formula (I) in the composition, respectively. For example, in certain embodiments, a composition includes a Michael acceptor and a mixture of compounds of formula (I), wherein $R^1$, $R^2$, and $R^3$ are each unsubstituted $C_2$-alkylenyl; k, l, and m are each independently an integer selected from the group consisting of 1 to 25; and x, y, and z are each 1. In certain embodiments, a composition may include a Michael acceptor and a mixture of compounds of formula (I), wherein $R^1$ and $R^2$ are each unsubstituted $C_2$-alkylenyl, and $R^3$ is methyl; k and l are each independently an integer selected from the group consisting of 1 to 25, and m is absent; and x and y are 1, and z is 0. In certain embodiments, a composition includes a Michael acceptor and a mixture of compounds of formula (I), wherein $R^1$ and $R^2$ are each unsubstituted $C_2$-alkylenyl, and $R^3$ is hydrogen; k and l are each independently an integer selected from the group consisting of 1 to 25, and m is absent; and x and y are 1, and z is 0. In some embodiments, the composition comprises at least one or a mixture of distinct Michael acceptors and a compound of formula (I), wherein $R^1$, $R^2$, and $R^3$ are each unsubstituted $C_2$-alkylenyl; and k, l, and m are each 1. In other embodiments, a composition includes a Michael acceptor and a compound of formula (III) where k, l, and m are each 1.

All above described compositions may also contain an additive selected from the group consisting of sulfate, sulfate salt, thiosulfate, thiosulfate salt, and any combination thereof. The compositions may further comprise sodium thiosulphate pentahydrate.

In certain embodiments, a composition contains a pure compound of formula (II), a pure compound of formula (III), a pure compound of formula (IV), a pure compound of formula (V), a pure compound of formula (VI), or any combination thereof, wherein the variables of said formulas are as defined above. Such compositions also contain a Michael acceptor or mixture of Michael acceptors.

In certain embodiments, a composition contains a mixture of compounds of formula (II), a mixture of compounds of formula (III), a mixture of compounds of formula (IV), a mixture of compounds of formula (V), a mixture of compounds of formula (VI), or any combination thereof, wherein the variables of said formulas are as defined above. Such compositions also contain a Michael acceptor or mixture of Michael acceptors.

In certain embodiments, a composition comprises from about 1% to about 80% by weight of one or more of the scavenging compounds disclosed herein, or from about 30 to about 80% by weight of one or more of the scavenging compounds disclosed herein, or from about 40 to about 80% by weight of one or more of the scavenging compounds disclosed herein, or from about 30 to about 60% by weight of one or more of the scavenging compounds disclosed herein.

In certain embodiments, a composition comprises from about 1 to about 35 percent by weight of one or more Michael acceptors, from about 1 to about 25 percent by weight, from about 1 to about 20 percent by weight, from about 1 to about 15 percent by weight, or from about 5 to about 15 percent by weight, of one or more Michael acceptors.

In additional embodiments, the compositions may contain a sulfate, sulfate salt, thiosulfate, thiosulfate salt, or any combination thereof. In some embodiments, the thiosulfate may be sodium thiosulfate pentahydrate.

The compositions can optionally include one or more additives. Suitable additives include, but are not limited to, asphaltene inhibitors, paraffin inhibitors, corrosion inhibitors, scale inhibitors, emulsifiers, water clarifiers, dispersants, emulsion breakers, hydrogen sulfide scavengers, gas hydrate inhibitors, biocides, pH modifiers, surfactants, solvents, and combinations thereof.

Suitable asphaltene inhibitors include, but are not limited to, aliphatic sulphonic acids; alkyl aryl sulphonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, polyisobutylene succinic anhydride, and combinations thereof.

Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes, and combinations thereof.

Suitable corrosion inhibitors include, but are not limited to, amidoamines, quaternary amines, amides, phosphate esters, and combinations thereof.

Suitable scale inhibitors include, but are not limited to, phosphates, phosphate esters, phosphoric acids, phosphonates, phosphonic acids, polyacrylamides, salts of acrylamido-methyl propane sulfonate/acrylic acid copolymer (AMPS/AA), phosphinated maleic copolymer (PHOS/MA), salts of a polymaleic acid/acrylic acid/acrylamido-methyl propane sulfonate terpolymer (PMA/AMPS), and combinations thereof.

Suitable emulsifiers include, but are not limited to, salts of carboxylic acids, products of acylation reactions between carboxylic acids or carboxylic anhydrides and amines, alkyl, acyl and amide derivatives of saccharides (alkyl-saccharide emulsifiers), and combinations thereof.

Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, cationic polymers such as diallyldimethylammonium chloride (DADMAC), and combinations thereof.

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different. Other suitable dispersion agents include lignin or derivatives of lignin such as lignosulfonate and naphthalene sulfonic acid and derivatives, and combinations thereof.

Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, resins such as phenolic and epoxide resins, and combinations thereof.

Suitable additional hydrogen sulfide scavengers include, but are not limited to, oxidants (e.g., inorganic peroxides such as sodium peroxide, or chlorine dioxide), aldehydes (e.g., of 1-10 carbons such as formaldehyde or glutaraldehyde or (meth)acrolein), triazines (e.g., monoethanol amine triazine, monomethylamine triazine, and triazines from multiple amines or mixtures thereof), glyoxal, chelated iron, and combinations thereof.

Suitable gas hydrate inhibitors include, but are not limited to, thermodynamic hydrate inhibitors (THI), kinetic hydrate inhibitors (KHI), anti-agglomerates (AA), and combinations thereof. Suitable thermodynamic hydrate inhibitors include, but are not limited to, NaCl salt, KCl salt, $CaCl_2$ salt, $MgCl_2$ salt, $NaBr_2$ salt, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), alkyl or cyclic esters of alcohols (such as ethyl lactate, butyl lactate, methylethyl benzoate), and combinations thereof. Suitable kinetic hydrate inhibitors and anti-agglomerates include, but are not limited to, polymers and copolymers, polysaccharides (such as hydroxy-ethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, proteins, and combinations thereof.

Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., bronopol and 2-2-dibromo-3-nitrilopropionamide (DBNPA)), sulfur compounds (e.g., isothiazolone, carbamates, and metronidazole), quaternary phosphonium salts (e.g., tetrakis(hydroxymethyl)phosphonium sulfate (THPS)), and combinations thereof. Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, peroxides, and combinations thereof.

Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include NaOH, KOH, $Ca(OH)_2$, CaO, $Na_2CO_3$, $KHCO_3$, $K_2CO_3$, $NaHCO_3$, MgO, and $Mg(OH)_2$.

Suitable surfactants include, but are not limited to, anionic surfactants, cationic surfactants, nonionic surfactants, and combinations thereof. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates, and combinations thereof. Cationic surfactants include alkyl trimethyl quaternary ammonium salts, alkyl dimethyl benzyl quaternary ammonium salts, dialkyl dimethyl quaternary ammonium salts, imidazolinium salts, and combinations thereof. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters, and combinations thereof. Also included are betaines and sultanes, amphoteric surfactants such as alkyl amphoacetates and amphodiacetates, alkyl amphopropionates and amphodipropionates, alkyliminodiproprionate, and combinations thereof.

In certain embodiments, the surfactant may be a quaternary ammonium compound, an amine oxide, an ionic or non-ionic surfactant, or any combination thereof. Suitable quaternary amine compounds include, but are not limited to, alkyl benzyl ammonium chloride, benzyl cocoalkyl($C_{12}$-$C_{18}$)dimethylammonium chloride, dicocoalkyl ($C_{12}$-$C_{18}$)dimethylammonium chloride, ditallow dimethylammonium chloride, di(hydrogenated tallow alkyl)dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhyexyl) dimethyl quaternary ammonium methyl sulfate.

Suitable solvents include, but are not limited to, water, isopropanol, methanol, ethanol, 2-ethylhexanol, heavy aromatic naphtha, toluene, ethylene glycol, ethylene glycol monobutyl ether (EGMBE), propylene glycol monomethyl ether, diethylene glycol monoethyl ether, xylene, and combinations thereof. Representative polar solvents suitable for formulation with the composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (ethylene glycol, 1,2-propylene glycol, 1,3-propylene glycol, ethylene glycol monobutyl ether, etc.), ketones (cyclohexanone, diisobutylketone, methyl isobutyl ketone), N-methylpyrrolidinone (NMP), N,N-dimethylformamide and the like. Representative of non-polar solvents suitable for formulation with the composition include aliphatics such as pentane, hexane, cyclohexane, methylcyclohexane, heptane, decane, dodecane, diesel, and the like; aromatics such as toluene, xylene, heavy aromatic naphtha, fatty acid derivatives (acids, esters, amides), and the like.

In certain embodiments, the solvent is a polyhydroxylated solvent, a polyether, an alcohol, or a combination thereof.

In certain embodiments, the solvent is monoethyleneglycol, methanol, dimethyl sulfoxide (DMSO), dimethylformamide (DMF), tetrahydrofuran (THF), or a combination thereof.

In some embodiments, the composition comprises EGMBE as the solvent.

In certain embodiments, the composition comprises from about 5 to about 25 percent by weight of one or more solvents, based on the weight of the composition. In certain embodiments, a composition comprises from about 5 to about 20 percent by weight of one or more solvents, based on the weight of the composition. In certain embodiments, a composition comprises about 5%, about 10%, about 15%, or about 20% by weight of one or more solvents, based on the weight of the composition.

Compositions made according to the invention may further include additional functional agents or additives that provide a beneficial property. Additional agents or additives will vary according to the particular scavenging composition being manufactured and its intend use as one skilled in the art will appreciate. According to one embodiment, the scavenging compositions do not contain any of the additional agents or additives.

In some embodiments, the compositions disclosed herein comprise 1) an alkanol hemiformal, 2) HEA, 3) a glycol ether solvent (such as EGMBE), and 4) triethanolamine (TEA). In some embodiments, the compositions disclosed herein comprise 1) about 1 to about 80 weight % of an alkanol hemiformal, 2) about 1 to about 35 weight % HEA, 3) about 2 to about 40 weight % of a glycol ether solvent (such as EGMBE), and 4) about 1 to about 20 weight % of triethanolamine (TEA).

In some embodiments, the compositions disclosed herein comprise an aqueous formaldehyde solution (formalin) and HEA, optionally wherein the formalin comprises methanol. In some embodiments, the formaldehyde solution is a solution of about 55% formaldehyde in water. The composition may also include a solvent disclosed herein. Additionally or alternatively, the composition may comprise a catalyst, such as TEA.

When the composition comprises a catalyst, the catalyst may be present from about 1 to about 20 weight % in the composition. In some embodiments, the catalyst may be present from about 1 to about 5, about 1 to about 10, or about 1 to about 15 weight % in the composition.

The compositions may be used for preventing solid deposits in process equipment and/or for sweetening a gas or liquid. The compositions may be used for scavenging hydrogen sulfide and/or mercaptans from a gas or liquid stream by treating said stream with an effective amount of a compound or composition of the invention, as described herein. The compositions can be used in any industry where it is desirable to capture hydrogen sulfide and/or mercaptans from a gas or liquid stream and prevent solid deposits in process equipment. In certain embodiments, the compositions can be used in water systems, condensate/oil systems/gas systems, or any combination thereof. In certain embodiments, the compositions can be applied to a gas or liquid produced or used in the production, transportation, storage, and/or separation of crude oil or natural gas. In certain embodiments, the compositions can be applied to a gas stream used or produced in a coal-fired process, such as a coal-fired power plant. In certain embodiments, the compositions can be applied to a gas or liquid produced or used in a waste-water process, a farm, a slaughter house, a land-fill, a municipality waste-water plant, a coking coal process, or a biofuel process. In certain embodiments, the compositions can be applied to a liquid in a contact tower.

In other embodiments, the compositions are used in connection with UltraFab technology, especially in connection with dry-gas hydrogen sulfide removal. UltraFab technology comprises compact, transportable systems that are able to remove hydrogen sulfide from fuel gas streams, enabling onsite heat and power without hydrogen sulfide emissions or system corrosion. UltraFab systems feature automation and process control to eliminate costly chemical over-treatment, improve safety and help meet regulatory specifications.

The compositions may be added to any fluid or gas containing hydrogen sulfide and/or a mercaptan, or a fluid or gas that may be exposed to hydrogen sulfide and/or a mercaptan. A fluid to which the compositions may be introduced may be an aqueous medium. The aqueous medium may comprise water, gas, and optionally liquid hydrocarbon. A fluid to which the compositions may be introduced may be a liquid hydrocarbon. The liquid hydrocarbon may be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene. In certain embodiments, the gas may be a sour gas. In certain embodiments, the fluid or gas may be a refined hydrocarbon product.

A fluid or gas treated with a compound or composition may be at any selected temperature, such as ambient temperature or an elevated temperature. In certain embodiments, the fluid (e.g., liquid hydrocarbon) or gas may be at a temperature of from about 40° C. to about 250° C. In certain embodiments, the fluid or gas may be at a temperature of from −50° C. to 300° C., 0° C. to 200° C., 10° C. to 100° C., or 20° C. to 90° C. In certain embodiments, the fluid or gas may be at a temperature of 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., or 40° C. In certain embodiments, the fluid or gas may be at a temperature of 85° C., 86° C., 87° C., 88° C., 89° C., 90° C., 91° C., 92° C., 93° C., 94° C., 95° C., 96° C., 97° C., 98° C., 99° C., or 100° C.

The compositions may be added to a fluid at various levels of water cut. For example, the water cut may be from 0% to 100% volume/volume (v/v), from 1% to 80% v/v, or from 1% to 60% v/v. The fluid can be an aqueous medium that contains various levels of salinity. In one embodiment, the fluid may have a salinity of 0% to 25%, about 1% to 24%, or about 10% to 25% weight/weight (w/w) total dissolved solids (TDS).

The fluid or gas in which the compositions are introduced may be contained in and/or exposed to many different types of apparatuses. For example, the fluid or gas may be contained in an apparatus that transports fluid or gas from one point to another, such as an oil and/or gas pipeline. In certain embodiments, the apparatus may be part of an oil and/or gas refinery, such as a pipeline, a separation vessel, a dehydration unit, or a gas line. The fluid may be contained in and/or exposed to an apparatus used in oil extraction and/or production, such as a wellhead. The apparatus may be part of a coal-fired power plant. The apparatus may be a scrubber (e.g., a wet flue gas desulfurizer, a spray dry absorber, a dry sorbent injector, a spray tower, a contact or bubble tower, falling film column, packed column, plate column, rotating disc contactor, venture tube, gas-liquid agitated vessel, bubble column spray tower, or the like). The apparatus may be a cargo vessel, a storage vessel, a holding tank, or a pipeline connecting the tanks, vessels, or processing units. In certain embodiments, the fluid or gas may be contained in water systems, condensate/oil systems/gas systems, or any combination thereof. In an embodiment, the composition may prevent solid deposits, for example in any of the above named apparatuses, and more particularly in a contact tower or contactor tower.

The compounds or compositions may be introduced into a fluid or gas by any appropriate method for ensuring dispersal of the scavenger through the fluid or gas. The compositions may be injected using mechanical equipment such as chemical injection pumps, piping tees, injection fittings, atomizers, quills, and the like. The compositions may be introduced with or without one or more additional polar or non-polar solvents depending upon the application and requirements. In certain embodiments, the compositions may be pumped into an oil and/or gas pipeline using an umbilical line. In certain embodiments, capillary injection systems can be used to deliver the compositions to a selected fluid. In certain embodiments, the compositions can be introduced into a liquid and mixed. In certain embodiments, the compositions can be injected into a gas stream as an aqueous or nonaqueous solution, mixture, or slurry. In certain embodiments, the fluid or gas may be passed through an absorption tower comprising a compound or composition of the invention.

The compositions may be applied to a fluid or gas to provide a scavenger concentration of about 1 parts per million (ppm) to about 1,000,000 ppm, about 1 parts per million (ppm) to about 100,000 ppm, about 10 ppm to about 75,000 ppm, about 100 ppm to about 45,000 ppm, about 500 ppm to about 40,000 ppm, about 1,000 ppm to about 35,000 ppm, about 3,000 ppm to about 30,000 ppm, about 4,000 ppm to about 25,000 ppm, about 5,000 ppm to about 20,000 ppm, about 6,000 ppm to about 15,000 ppm, or about 7,000 ppm to about 10,000 ppm. The compositions may be applied to a fluid at a concentration of about 100 ppm to about 2,000 ppm, about 200 ppm to about 1,500 ppm, or about 500 ppm to about 1000 ppm. Each system may have its own requirements, and a more sour gas (e.g., containing more hydrogen sulfide) may require a higher dose rate of a compound or composition of the invention. In certain embodiments, the compositions may be applied to a fluid or gas in an equimolar amount or greater relative to hydrogen sulfide and/or mercaptans present in the fluid or gas.

The hydrogen sulfide and/or mercaptan in a fluid or gas may be reduced by any amount by treatment with a compound or composition of the invention. The actual amount of residual hydrogen sulfide and/or mercaptan after treatment may vary depending on the starting amount. In certain embodiments, the hydrogen sulfide and/or mercaptan levels may be reduced to about 150 ppm by volume or less, as measured in the vapor phase, based on the volume of the liquid media. In certain embodiments, the hydrogen sulfide levels and/or mercaptan may be reduced to 100 ppm by volume or less, as measured in the vapor phase, based on the volume of the liquid media. In certain embodiments, the hydrogen sulfide and/or mercaptan levels may be reduced to 50 ppm by volume or less, as measured in the vapor phase, based on the volume of the liquid media. In certain embodiments, the hydrogen sulfide and/or mercaptan levels may be reduced to 20 ppm by volume or less, as measured in the vapor phase, based on the volume of the liquid media. In certain embodiments, the hydrogen sulfide and/or mercaptan levels may be reduced to 15 ppm by volume or less, as measured in the vapor phase, based on the volume of the liquid media. In certain embodiments, the hydrogen sulfide and/or mercaptan levels may be reduced to 10 ppm by volume or less, as measured in the vapor phase, based on the volume of the liquid media. In certain embodiments, the hydrogen sulfide and/or mercaptan levels may be reduced to 5 ppm by volume or less, as measured in the vapor phase, based on the volume of the liquid media. In certain embodiments, the hydrogen sulfide and/or mercaptan levels may be reduced to 0 ppm by volume, as measured in the vapor phase, based on the volume of the liquid media.

In certain embodiments, the compositions may be soluble in an aqueous phase such that the captured sulfur-based species will migrate into the aqueous phase. If an emulsion is present, the captured sulfur-based species can be migrated into the aqueous phase from a hydrocarbon phase (e.g., crude oil) and removed with the aqueous phase. If no emulsion is present, a water wash can be added to attract the captured sulfur-based species. In certain embodiments, the compositions can be added before a hydrocarbon (e.g., crude oil) is treated in a desalter, which emulsifies the hydrocarbon media with a water wash to extract water soluble contaminants and separates and removes the water phase from the hydrocarbon.

In certain embodiments, a water wash may be added in an amount suitable for forming an emulsion with a hydrocarbon. In certain embodiments, the water wash may be added in an amount of from about 1 to about 50 percent by volume based on the volume of the emulsion. In certain embodiments, the wash water may be added in an amount of from about 1 to about 25 percent by volume based on the volume of the emulsion. In certain embodiments, the wash water may be added in an amount of from about 1 to about 10 percent by volume based on the volume of the emulsion. In certain embodiments, the amount of hydrocarbon may be present in an amount of from about 50 to about 99 percent by volume based on the volume of the emulsion. In certain embodiments, the hydrocarbon may be present in an amount of from about 75 to about 99 percent by volume based on the volume of the emulsion. In certain embodiments, the hydrocarbon may be present in an amount of from about 90 to about 99 percent by volume based on the volume of the emulsion.

The water wash and hydrocarbon may be emulsified by any conventional manner. In certain embodiments, the water wash and hydrocarbon may be heated and thoroughly mixed to produce an oil-in-water emulsion. In certain embodiments, the water wash and hydrocarbon may be heated at a temperature in a range of from about 90° C. to about 150° C. The water wash and hydrocarbon may be mixed in any conventional manner, such as an in-line static mixer or an in-line mix valve with a pressure drop of about 0.2 to about 2 bar depending on the density of the hydrocarbon. The emulsion may be allowed to separate, such as by settling, into an aqueous phase and an oil phase. In certain embodiments, the aqueous phase may be removed. In another embodiment, the aqueous phase may be removed by draining the aqueous phase.

Optionally, demulsifiers may be added to aid in separating water from the hydrocarbon. In certain embodiments, the demulsifiers include, but are not limited to, oxyalkylated organic compounds, anionic surfactants, nonionic surfactants or mixtures of these materials. The oxyalkylated organic compounds include, but are not limited to, phenol-formaldehyde resin ethoxylates and alkoxylated polyols. The anionic surfactants include alkyl or aryl sulfonates, such as dodecylbenzenesulfonate. These demulsifiers may be added in amounts to contact the water from about 1 to about 1000 ppm by weight based on the weight of the hydrocarbon.

Any composition and/or formulation disclosed herein may comprise water or the composition and/or formulation may be anhydrous.

The foregoing may be better understood by reference to the following examples, which are presented for purposes of illustration and are not intended to limit the scope of the invention.

In Experiment 1, a formulation comprising 1) an alkanol hemiformal (the bis-hemi formyl of glycerin), 2) HEA, 3) EGMBE, and 4) TEA was added to a clear glass jar and titrated using about 10% hydrogen sulfide gas in a bubble tower to 100% completion. The reaction product was kept at ambient temperature for over two months and the solution in the jar remained clear (meaning no precipitate formed). The same procedures were repeated but the HEA was not added to the glass jar. Within 24 hours, a solid block of white precipitate formed in the jar.

The bubble tower was a pressurized, quantitative, mini-bubble-cell tower similar in design to an Ultra-Fab tower.

In Experiment 2, a solution of the bis-hemi-formyl of glycerin in the presence of TEA containing about 10% of HEA and EGMBE was placed in the bubble tower described above. A gaseous mixture of about 1000 ppm of $H_2S$, about 5% carbon dioxide with the balance methane was then bubbled throughout at a fixed flow rate. The $H_2S$ was completely removed (>1 ppm H₂S in the effluent) until 100% scavenger conversion. The gas mixture was continued until the concentration of H₂S in was equal to the H₂S in the effluent out. The resultant spent product was clear for more than four months.

In Experiment 3, a formulation comprising about 50 grams of 37% formalin, about 34 grams of HEA, about 10 grams of TEA, and about 6 grams of EGMBE was titrated with about 10% hydrogen sulfide in the bubble tower described above.

The graph shown in FIG. 1 represents a reaction run time of 12 to 20 hours. Break through was calculated to be about 20 hours. The run in Experiment 1 was exhausted in about 5 hours.

In Experiment 3, the reaction solution was clear during the entire experiment. The last 8 hours of run time the hydrogen sulfide concentration in the effluent gas was less than about 0.1 ppm with the expected hydrogen sulfide break through at about 20 hours. After sitting for about 36 hours, white solids began to form, perhaps due to the lower concentration of HEA.

In Experiment 4, an aqueous solution of 37% formalin, HEA, TEA and EGMBE was placed in the bubble tower apparatus described above. A gaseous mixture of 10% H₂S, 5% carbon dioxide with the balance of nitrogen was bubbled throughout until complete conversion of the scavenger was achieved. After approximately 24 hours after completion of this experiment, crystals were deposited. Analysis of this solid material indicated that it was mainly low molecular weight poly-acrylate.

A repeat of this experiment containing about 500 ppm of HTMPO resulted with clear spent material. This spent material remains clear after three months of resting at ambient conditions.

Using the claimed composition ensures uninterrupted operation of scavenging process units, for example contact towers, without the need to shut down the unit to remove solid deposits.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a Michael acceptor" is intended to include "at least one Michael acceptor" or "one or more Michael acceptors."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A composition, comprising:
   a Michael acceptor,
   a scavenging compound, and
   an anaerobic polymerization inhibitor,
   wherein the scavenging compound comprises formaldehyde and/or a formaldehyde equivalent, and wherein the Michael acceptor comprises an α,β-unsaturated ester.

2. The composition of claim 1, wherein the Michael acceptor comprises the following structure:

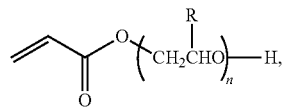

wherein R is selected from H, methyl, or ethyl and n is a number from 1 to 10.

3. The composition of claim 1, wherein the α,β-unsaturated ester is selected from the group consisting of an ethoxylated ester, a propoxylated ester, an acrylate ester, and any combination thereof.

4. The composition of claim 1, wherein the α,β-unsaturated ester is selected from the group consisting of a mono-ethoxylate of acrylic acid, a di-ethoxylate of acrylic acid, a tri-ethoxylate of acrylic acid, a mono-propoxylate of acrylic acid, a di-propoxylate of acrylic acid, a tri-propoxylate of acrylic acid, and any combination thereof.

5. The composition of claim 1, wherein the α,β-unsaturated ester is selected from the group consisting of methyl acrylate, ethyl acrylate, propyl acrylate, butyl acrylate, propyl hydroxyl ester, hydroxyl butyl acrylate, hydroxyl ethyl acrylate, and any combination thereof.

6. The composition of claim 1, wherein the formaldehyde equivalent comprises an alkyl hemiformal compound and/or an alkanol hemiformal compound.

7. The composition of claim 1, wherein the formaldehyde equivalent comprises the following structure:

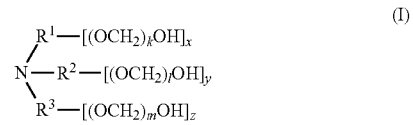

wherein $R^1$, $R^2$, and $R^3$ are each independently selected from the group consisting of hydrogen, alkylenyl, alkenylenyl, alkynylenyl, alkyl, alkenyl, and alkynyl, wherein said alkylenyl, alkenylenyl, alkynylenyl, alkyl, alkenyl, and alkynyl are each independently, at each occurrence, substituted or unsubstituted with one or more suitable substituents;

k, l, and m are each independently an integer selected from the group consisting of 0 to 25, wherein k+l+m is >0; and x, y, and z are each independently an integer selected from the group consisting of 0 and 1, wherein x+y+z is 1, 2, or 3;

provided that:
when x is 0, $R^1$ is hydrogen, alkyl, alkenyl, or alkynyl; and when x is 1, $R^1$ is alkylenyl, alkenylenyl, or alkynylenyl;
when y is 0, $R^2$ is hydrogen, alkyl, alkenyl, or alkynyl; and when y is 1, $R^2$ is alkylenyl, alkenylenyl, or alkynylenyl;
when z is 0, $R^3$ is hydrogen, alkyl, alkenyl, or alkynyl; and when z is 1, $R^3$ is alkylenyl, alkenylenyl, or alkynylenyl; and
when x is 1, y is 1, z is 1, k is 1, l is 1, and m is 1, then $R^1$, $R^2$, and $R^3$ are not simultaneously unsubstituted $C_2$-alkylenyl.

8. The composition of claim 7, wherein x+y+z is 3, and $R^1$, $R^2$, and $R^3$ are each selected from the group consisting of alkylenyl, $C_2$-alkylenyl, unsubstituted $C_2$-alkylenyl, and any combination thereof.

9. The composition of claim 7, wherein x is 1, y is 1, z is 0, $R^1$ and $R^2$ are each alkylenyl, and $R^3$ is alkyl.

10. The composition of claim 7, wherein x is 1, y is 1, z is 0, $R^1$ and $R^2$ are each alkylenyl, and $R^3$ is hydrogen.

11. The composition of claim 7, wherein the formaldehyde equivalent comprises the following formula (II),

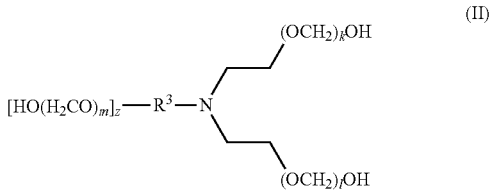

(II)

wherein
$R^3$ is selected from the group consisting of hydrogen, alkylenyl, alkenylenyl, alkynylenyl, alkyl, alkenyl, and alkynyl, wherein said alkylenyl, alkenylenyl, alkynylenyl, alkyl, alkenyl, and alkynyl are each independently substituted or unsubstituted with one or more suitable substituents;
k, l, and m are each independently an integer selected from the group consisting of 0 to 25, wherein k+l+m is >0; and z is 0 or 1;
provided that:
when z is 1, $R^3$ is alkylenyl, alkenylenyl, or alkynylenyl;
when z is 0, $R^3$ is hydrogen, alkyl, alkenyl, or alkynyl; and
when z is 1, k is 1, l is 1, and m is 1, then $R^3$ is not an unsubstituted $C_2$-alkylenyl

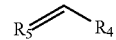

12. The composition of claim 1, wherein the anaerobic polymerization inhibitor comprises a member selected from the group consisting of 4-hydroxy-2,2,6,6-tetramethyl piperidinoxyl
(HTMPO), phenothiazine, and any combination thereof.

13. The composition of claim 1, wherein the composition comprises from about 1 to about 35 weight % of the Michael acceptor and about 1 to about 80 weight % of the formaldehyde and/or formaldehyde equivalent.

14. The composition of claim 1, wherein the composition comprises from about 1 to about 35 weight % of the Michael acceptor, from about 1 to about 80 weight % of the formaldehyde or formaldehyde equivalent, and from about 10 ppm to about 10,000 ppm of the anaerobic polymerization inhibitor.

15. The composition of claim 1, further comprising from about 1 to about 20 weight % of triethanolamine.

16. The composition of claim 1, wherein the composition comprises the formaldehyde equivalent and further comprises a glycol ether solvent, triethanolamine, and hydroxyl ethyl acrylate, wherein the formaldehyde equivalent is an alkanol hemiformal.

17. The composition of claim 1, wherein the composition comprises the formaldehyde and further comprises water and optionally methanol.

18. The composition of claim 1, wherein the composition is anhydrous.

19. A method of scavenging hydrogen sulfide, comprising:
adding the composition of claim 1 to a fluid or gas comprising the hydrogen sulfide and allowing the composition to react with the hydrogen sulfide, thereby scavenging the hydrogen sulfide.

* * * * *